US011831765B2

(12) United States Patent
Chen

(10) Patent No.: US 11,831,765 B2
(45) Date of Patent: Nov. 28, 2023

(54) SYSTEM AND METHOD FOR PROTECTING CONVENTIONAL QUANTUM KEY DISTRIBUTION PROTOCOLS

(71) Applicant: AhP-Tech Inc., New Taipei (TW)

(72) Inventor: Chao-Huang Chen, New Taipei (TW)

(73) Assignee: AhP-Tech Inc., New Taipei (TW)

( * ) Notice: Subject to any disclaimer, the term of this patent is extended or adjusted under 35 U.S.C. 154(b) by 127 days.

(21) Appl. No.: 17/565,489

(22) Filed: Dec. 30, 2021

(65) Prior Publication Data
US 2023/0216671 A1 Jul. 6, 2023

(51) Int. Cl.
*H04L 9/08* (2006.01)
(52) U.S. Cl.
CPC .......... *H04L 9/0858* (2013.01); *H04L 9/0855* (2013.01)
(58) Field of Classification Search
CPC ............................ H04L 9/0858; H04L 9/0855
See application file for complete search history.

(56) References Cited

U.S. PATENT DOCUMENTS

| 8,155,318 | B2 * | 4/2012 | Tsurumaru | ............ | H04L 9/0858 380/278 |
| 11,681,200 | B2 * | 6/2023 | Weiner | ................. | H04L 9/0852 359/560 |
| 2011/0126011 | A1 * | 5/2011 | Choi | ..................... | H04L 9/0852 713/168 |
| 2020/0153619 | A1 * | 5/2020 | Ribordy | ................ | H04L 9/0852 |
| 2020/0274703 | A1 * | 8/2020 | Lukens | .................. | H04L 9/0858 |
| 2021/0119788 | A1 * | 4/2021 | Wang | ..................... | H04B 10/70 |
| 2021/0203493 | A1 * | 7/2021 | Chen | ....................... | G06F 17/14 |
| 2022/0231844 | A1 * | 7/2022 | Berend | ................. | H04L 9/0838 |

FOREIGN PATENT DOCUMENTS

WO WO-2022003704 A1 * 1/2022

OTHER PUBLICATIONS

A. Ambainis, M. Mosca, A. Tapp and R. De Wolf, "Private quantum channels," Proceedings 41st Annual Symposium on Foundations of Computer Science, Redondo Beach, CA, USA, 2000, pp. 547-553, doi: 10.1109/SFCS.2000.892142. (Year: 2000).*
Biham, et al. "Security of quantum key distribution against all collective attacks." Algorithmica 34 (2002): 372-388. (Year: 2002).*

(Continued)

*Primary Examiner* — Michael Simitoski

(57) ABSTRACT

A system with methods to enhance key strength for a quantum shared key which is derived by a conventional quantum key distribution protocol and the system provides a single optical communication channel with security protection mechanism for key distribution without relying on an authenticated public classical channel. The system is implemented with technology in combination of key-strength enhancement, re-encoding operation, density-matrix verification, and grating control for a single optical communication channel where the system can be integrated with a conventional Quantum-Key-Distribution protocol such as BB84 or B92, but excluding GHz-clocked QKD system. Thereby, the system can help a known QKD system to overcome current drawbacks of an apparatus implemented over a conventional QKD protocol so as to derive an enhanced quantum shared key.

7 Claims, 6 Drawing Sheets

(56) References Cited

OTHER PUBLICATIONS

Djordjevic, Ivan B. Physical-layer security and quantum key distribution. Berlin/Heidelberg, Germany: Springer, 2019. (Year: 2019).*

Kak, Subhash. "A three-stage quantum cryptography protocol." Foundations of Physics Letters 19 (2006): 293-296. (Year: 2006).*

Mehic, Miralem, et al. "Error Reconciliation in Quantum Key Distribution Protocols." (2020): 222-236. (Year: 2020).*

A. I. Nurhadi and N. R. Syambas, "Quantum Key Distribution (QKD) Protocols: A Survey," 2018 4th International Conference on Wireless and Telematics (ICWT), Nusa Dua, Bali, Indonesia, 2018, pp. 1-5, doi: 10.1109/ICWT.2018.8527822. (Year: 2018).*

Jo, Yonggi, et al. "Efficient high-dimensional quantum key distribution with hybrid encoding." Entropy 21.1 (2019): 80. (Year: 2019).*

Zeng, Guihua, and Xinmei Wang. "Quantum key distribution with authentication." arXiv preprint quant-ph/9812022 (1998). (Year: 1998).*

* cited by examiner

SYSTEM AND METHOD FOR PROTECTING CONVENTIONAL QUANTUM KEY DISTRIBUTION PROTOCOLS

BACKGROUND OF THE INVENTION

1. Field of the Invention

The present disclosure relates to a quantum-communication security system, and in particular, to a system or solutions with methods that enhance key strength for a quantum shared key which is derived by a conventional quantum key distribution protocol and also provide a security mechanism on a single optical communication channel to protect protocol transmission and key distribution.

2. Description of the Related Art

There are several known flaws with conventional quantum distribution key (QKD) apparatuses available. Most of the current solutions against these QKD flaws also restrict the applicable scenarios of a quantum shared key derived by a conventional QKD protocol. For instance, due to eavesdropping issues in the hand-shaking processes driven by a QKD protocol for deriving a quantum shared key, a key generator is usually requested to limit the power output of the optical source. Thus, a quantum shared key will be very restricted on transmission distance. However, for another instance, even solutions with information reconciliation coupled to privacy amplification may avoid some eavesdropping issues during early key deriving stages driven by a conventional QKD protocol, it will also lose some key strength based on key length itself; thus, it will raise another flaw when a quantum shared key for use in a classical channel faces a brute forcing attack. Besides, through a classical channel, there are also forgery information issues, replay-attacking issues, and man-in-middle attacking issues.

Therefore, it is desirable to develop a solution with a system and method to protect the key deriving processes and enhance key strength for a conventional QKD approach.

BRIEF SUMMARY OF THE INVENTION

In view of the drawbacks of the prior art, it is an object of the present disclosure to provide a solution to protect key deriving processes of a conventional QKD protocol, wherein the solution includes a system and methods not only to enhance security on hand-shaking processes between a transmitter side and a receiver side, but also to enhance key strength for a quantum shared key derived by a conventional QKD protocol (such as BB84 protocol, B92 protocol, and so on). In accordance with this disclosure, even if a conventional QKD protocol is used, the risk of a quantum shared key being compromised by quantum computing attacks can be effectively reduced during the key deriving processes based on the embodiments of the present disclosure. The related technologies can be implemented as a device or an electronic system with reasonable cost, and the present disclosure effectively avoids the defects of implementation in the prior QKD solutions as well.

To achieve the above objects and more, the present disclosure provides a solution to be integrated with key deriving processes of a conventional QKD protocol. Wherein the solution (or a system) is implemented with the method comprising the following means: a) only adopting a single optical communication channel to support transmission for a conventional Quantum-Key-Distribution protocol (such as BB84 or B92, but excluding GHz-clocked QKD systems); b) a transmitter side and a receiver side shall adopt at least three bases with binary bit-states coupled to a conventional Quantum-Key-Distribution protocol for use, so that the transmitter side will be able to prepare at least six kinds of polarization states; for example, adopting a polarization angle of $\pi/3$, $\pi/4$, and $\pi/6$ as available bases such that $\pi/3$ stands for binary 0, $5\pi/6$ stands for binary 1, $\pi/6$ stands for binary 0, $2\pi/3$ stands for binary 1, $\pi/4$ stands for binary 0, and $3\pi/4$ stands for binary 1; c) configuring a security length $L_s$ of a quantum key; once the length of an original quantum key $K_1$ being smaller than $L_s$ wherein $K_1$ is derived according to a conventional Quantum-Key-Distribution protocol, deriving an extended quantum key $K_2$ via performing duplicated operations on the original quantum key $K_1$ wherein the length of $K_2$ is $L_{K2}$ which shall be equal to or larger than $L_s$, so as to generate the extended quantum key $K_2$ based on the derived $K_1$ and the configured $L_s$; otherwise letting the extended quantum key $K_2$ be the same as the original quantum key $K_1$; and d) allowing the extended quantum key $K_2$ as a quantum shared key for distribution and conducting a scramble mechanism into the extended quantum key $K_2$ so as to derive an enhanced quantum key $K_3$ embedded with the extended quantum key $K_2$; wherein the enhanced quantum key $K_3$ is for key transmission through the single optical communication channel. Thus, that will achieve the effect of deriving an enhanced quantum shared key according to a conventional QKD protocol with superior protection.

It is to be noted that the following mentioned modules are equivalent to a set of software libraries or instructions formed with a plurality of compiled functions executed by a x86-architectured CPU and can be re-accessed for performing a series of processes step by step. Moreover, the following mentioned generators are equivalent to a set of loadable software libraries or compiled instructions with coded algorithm stored in a non-volatile memory to be executed by a micro control unit which can be driven by an active system.

In order to implement the above-mentioned method, the present disclosure provides an embodiment to be integrated with a conventional QKD protocol. This embodiment implements a system which includes a single optical communication channel, an encoding generator, a density-matrix generator, and an error correction module. The single optical communication channel collaborates with Bragg gratings to transceive photons with prepared polarization states, and supports basis measurement for a conventional Quantum-Key-Distribution protocol; wherein, the Bragg gratings are applied for controlling variation of optical phases, thereby the system can overcome the eavesdropping issues even when adopting an optical source output with large power.

In the same embodiment, the encoding generator is for re-encoding messages (such as q-bits or communication information) which will be transmitted according to a conventional Quantum-Key-Distribution protocol, so as to generate corresponding re-encoded messages; wherein the re-encoded messages will be transmitted through the single optical communication channel. In an embodiment, the transmitter side collaborates with the encoding generator to provide the following available encoding means for setting system encoding configurations: a) re-encoding the q-bits for transmission with an expression of a Bloch-ball coordinate system; for example, since the state of each q-bit can be expressed as $$|\psi\rangle = \cos\frac{\theta}{2}|0\rangle + e^{i\varphi}\sin\frac{\theta}{2}|1\rangle \quad \theta \in [0, \pi], \varphi \in [0, 2, \pi]$$

based on a Bloch-ball coordinate system, each q-bit can be encoded according to the parameter set [$\gamma$, $\theta$, $\varphi$] wherein $\gamma$ is the distance from the origin to the point ($\theta$, $\varphi$); b) re-encoding the q-bits for transmission with an expression of probability amplitude; c) re-encoding the q-bits for transmission with an expression of density matrix; for example, treating a series of q-bits as a mixed state, so as to derive the density operator $$\rho = \sum_i w_i |\psi_i\rangle \langle \psi_i|,$$

wherein $\psi_i$ is expressed for available bases and $\omega_i$ is expressed for corresponding probability, thus the corresponding density matrix will be Q wherein each element $Q_{ij}$ of the density matrix Q shall be $$\sum_k w_k \langle b_i | \psi_i \rangle \langle \psi_k | b_j \rangle$$

such that a series of q-bits can be encoded according to the parameter pair [$\omega$, $\psi$]; and d) re-encoding the q-bits for transmission via mapping polarization angles onto a time coordinate system formed with clock scales; for example, a q-bit with state of polarization angle $\pi/3$ can be encoded according to the numerical pair [02,00] while a q-bit with state of polarization angle $3\pi/4$ can be encoded according to the numerical pair [04,30].

Moreover, still in the same embodiment, the density-matrix generator derives a density operator according to a density matrix generated from the re-encoded q-bits; thereby the receiver side will be able to determine whether there is any transmission loss according to the received density operator via leveraging an operation of measurement on the received q-bits through the single optical communication channel. In an embodiment, the above-mentioned operation of the density matrix will be performed by the receiver side through the single optical communication channel and such operation comprises: a) adopting a measurement operator to measure the received density matrix; b) deriving a density operator on the receiver side according to a measured density matrix derived via the measurement operator; c) deriving sum of the probability of each measured quantum state based on the derived density operator; and d) once the sum of the probability of each measured quantum state is equal to or larger than 1, meanwhile each element of the measured density matrix is non-negative, determining that there is no transmission loss with the received q-bits.

Further, in an embodiment, after determining that there is no transmission loss with the received q-bits, the error correction module performs an operation of information reconciliation with a cascade protocol on the received q-bits, so as to correct the wrong q-bits of the current received q-bits. Thereby, the receiver side will perform a decoding operation on the corrected q-bits based on an available encoding configuration, so as to retrieve a quantum shared key derived from an enhanced protection system.

However, in an embodiment, in order to retrieve a quantum shared key, the above-mentioned decoding operation on the corrected q-bits further comprises: a) measuring and analyzing on the received polarization states for determining whether there is any phase variation with the received polarization states; b) once determining that there is a phase variation with the received polarization states, restoring corresponding phasing status for the received q-bits; and c) performing communication of a Quantum-Key-Distribution protocol on the received q-bits between the transmitter side and the receiver side to determine bases and matched q-bits for use in deriving a quantum shared key according to a conventional Quantum-Key-Distribution protocol.

Thereafter, besides making use of the determined bases and matched q-bits to form an original quantum key $K_1$, the system configures a security length $L_s$ of a quantum key in the following ways: a) setting a first length $L_{s1}$ based on the block size $L_{BLK}$ of a data which will be encrypted by a quantum shared key; wherein the block size $L_{BLK}$ shall be an integral multiple of the length $L_{K1}$ of $K_1$; b) setting a second length $L_{s2}$ based on the $L_{s1}$ adding a padding size $L_{PD}$; wherein the $L_{s2}$ shall be an integral multiple of the optical wave length $L_W$ for data transmission through the single optical communication channel; wherein the padding size $L_{PD}$ is for filling a rest of the block size with changeable stuffs and the padding size $L_{PD}$ shall be smaller than the length $L_{K1}$ of $K_1$; c) $L_{s1}$ and $L_{s2}$ shall be reset for each data which is to be encrypted for transmission; d) once the data size is less than the length $L_{K1}$ of the original quantum key $K_1$, adding a padding message to the data to be transmitted, such that it makes the data size at least equal to $L_{K1}$; and e) setting the final $L_{s2}$ as a feasible $L_s$.

Once the length $L_{K1}$ of an original quantum key $K_1$ is smaller than $L_s$ wherein $K_1$ is derived according to a conventional Quantum-Key-Distribution protocol, the system will derive an extended quantum key $K_2$ via performing duplicated operations on the original quantum key $K_1$ wherein the length of $K_2$ is $L_{K2}$ which shall be equal to or larger than $L_s$, so as to generate the extended quantum key $K_2$ based on the derived $K_1$ and the configured $L_s$ (when $L_{K1}<L_s \rightarrow L_{K2}=n \cdot L_{K1}$ where $n \in \mathbb{Z}^{++}$, and $L_{K2} \geq L_s$); otherwise, the system will make the extended quantum key $K_2$ be the same as the original quantum key $K_1$ (if $L_{K1} \geq L_s \rightarrow K_2 = K_1$).

In order to enhance key strength of a quantum shared key, the system not only makes the extended quantum key $K_2$ as an updated quantum shared key for distribution but also conducts a scramble mechanism into the extended quantum key $K_2$ so as to derive an enhanced quantum key $K_3$ embedded with the extended quantum key $K_2$, wherein the length $L_{K3}$ of the enhanced quantum key $K_3$ shall be larger than $L_{K2}$; in addition, letting the total length of conducted scramble be $L_{scr}$, all of $L_{scr}$, $L_{K2}$, and $L_{K3}$ shall be an integral multiple of $L_s$ ($L_{K3}>L_{K2}$, $L_{scr}=p \cdot L_s$, $L_{K3}=q \cdot L_s$ and $L_{K2}=r \cdot L_s$ where p, q, r $\in \mathbb{Z}^{++}$). Finally, satisfying the above-mentioned restricted terms, the enhanced quantum key $K_3$ is derived for key transmission through the single optical communication channel.

DETAILED DESCRIPTION OF THE INVENTION

To facilitate understanding of the objects, characteristics, dataflow and effects of this present disclosure, embodiments together with the attached drawings for the detailed description of the present disclosure are provided.

A plurality of embodiments in regard to a system and methods for protecting conventional Quantum-Key-Distribution protocols are provided as follows. In some embodiments, this disclosure is implemented as a system with technology in the combination of key-strength enhancement, re-encoding operation, density-matrix verification, and grating control for a single optical communication channel where the system can be integrated with a conventional Quantum-Key-Distribution protocol such as BB84 or B92, but excluding GHz-clocked Quantum-Key-Distribution system. Thereby, through a single optical communication channel with a protection mechanism for key distribution, a quantum shared key derived by a conventional Quantum-Key-Distribution (hereafter, QKD) protocol can couple to the system, so as to generate an enhanced quantum shared key for overcoming the drawbacks of a conventional QKD protocol.

In some embodiments, this technology provides a mechanism with security enhanced method for integration with a known QKD system. Wherein the security enhanced method comprises the following means: a) only adopting a single optical communication channel to support transmission for a conventional Quantum-Key-Distribution protocol (such as BB84 or B92, but excluding GHz-clocked QKD systems); b) a transmitter side and a receiver side shall adopt at least three bases with binary bit-states coupled to a conventional Quantum-Key-Distribution protocol for use, so that the transmitter side will be able to prepare at least six kinds of polarization states; c) configuring a security length $L_s$ of a quantum key; once the length $L_{K1}$ of an original quantum key $K_1$ being smaller than $L_s$ wherein $K_1$ is derived according to a conventional Quantum-Key-Distribution protocol, deriving an extended quantum key $K_2$ via performing duplicated operations on the original quantum key $K_1$ wherein the length of $K_2$ is $L_{K2}$ which shall be equal to or larger than $L_s$, so as to generate the extended quantum key $K_2$ based on the derived $K_1$ and the configured $L_s$; otherwise letting the extended quantum key $K_2$ be the same as the original quantum key $K_1$; and d) letting the extended quantum key $K_2$ as a quantum shared key for distribution and conducting a scramble mechanism into the extended quantum key $K_2$ so as to derive an enhanced quantum key $K_3$ embedded with the extended quantum key $K_2$; wherein the enhanced quantum key $K_3$ is for key transmission through the single optical communication channel. Thus, that will achieve the effect of deriving an enhanced quantum shared key according to a conventional QKD protocol with superior protection.

Figure 1:
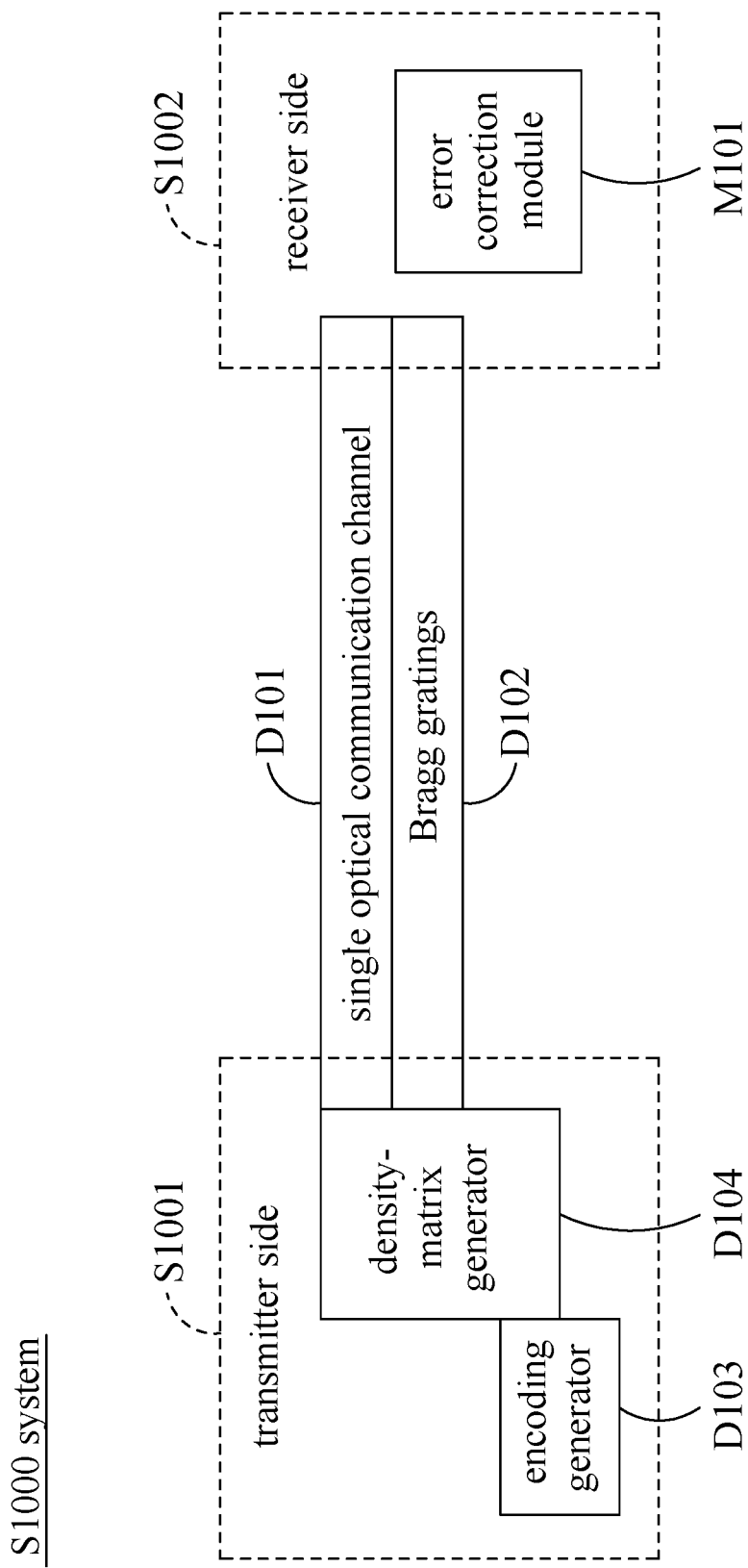
FIG. 1 is a structural block diagram of a system for protecting conventional QKD protocols according to a user scenario regarding the present disclosure integrated with a conventional QKD system excluding any authenticated public classical channel.

Refer to FIG. 1, which is a structural block diagram of a system for protecting conventional QKD protocols according to an embodiment of the present disclosure. In an embodiment, in order to implement the above-mentioned security enhanced method so as to be integrated with a known conventional QKD system (for example, a BB84 system), the system S1000 of the present disclosure comprises a single optical communication channel D101 collaborating with Bragg gratings D102, an encoding generator D103, a density-matrix generator D104, and an error correction module M101. Wherein, the single optical communication channel D101 and Bragg gratings D102 form a single transmission path for QKD communications, and that means a known QKD system such as a BB84 system that integrates the present disclosure will no longer rely on an authenticated public classical channel. Besides, the encoding generator D103 and the density-matrix generator D104 are able to be integrated on the transmitter side S1001 of the QKD system, and the error correction module M101 is able to be integrated on the receiver side S1002 of the same QKD system.

Figure 2A:
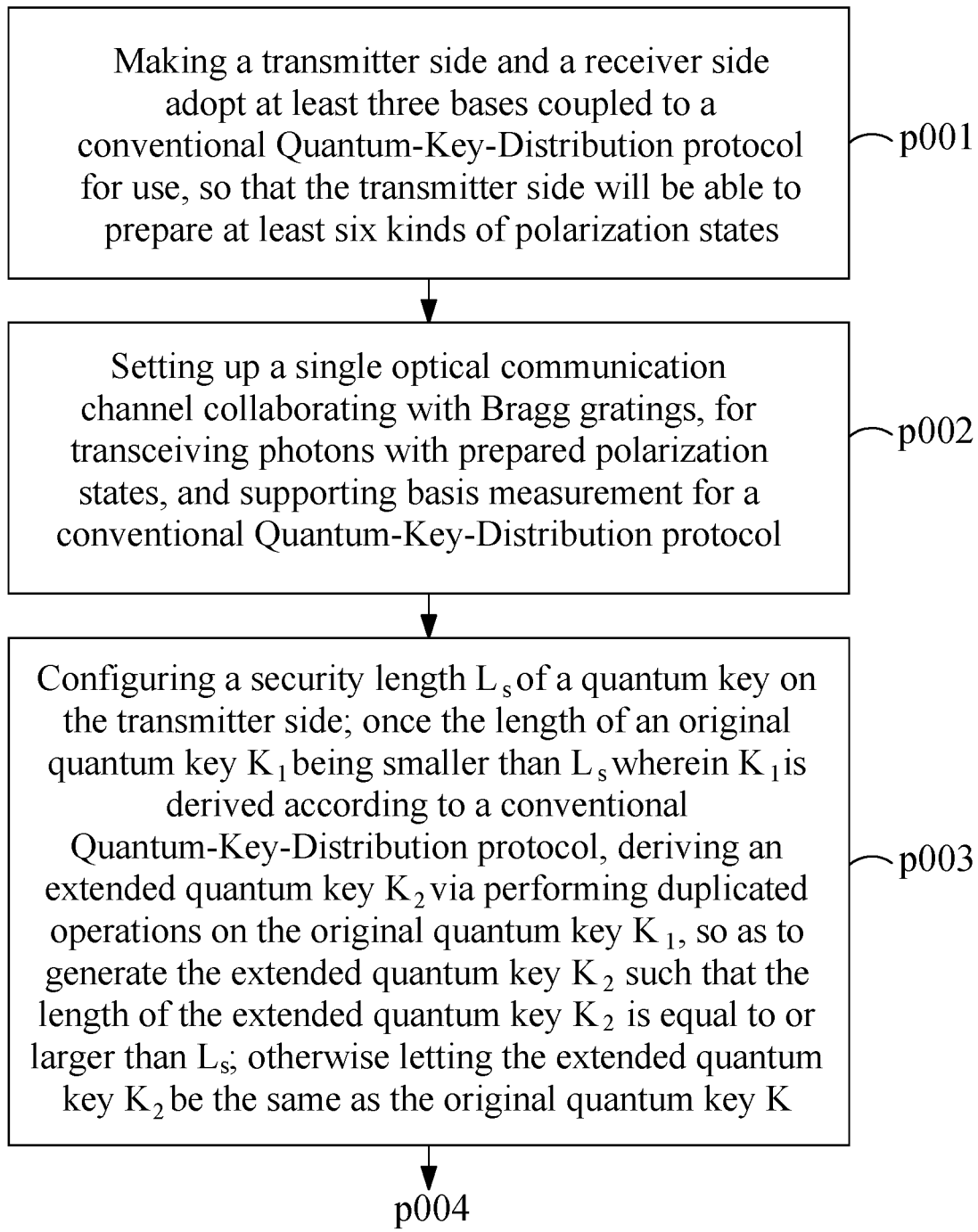
FIG. 2A is a dataflow diagram showing how the system of the present disclosure implements the main security enhanced method to achieve the object of protecting a conventional QKD system.
Figure 2B:
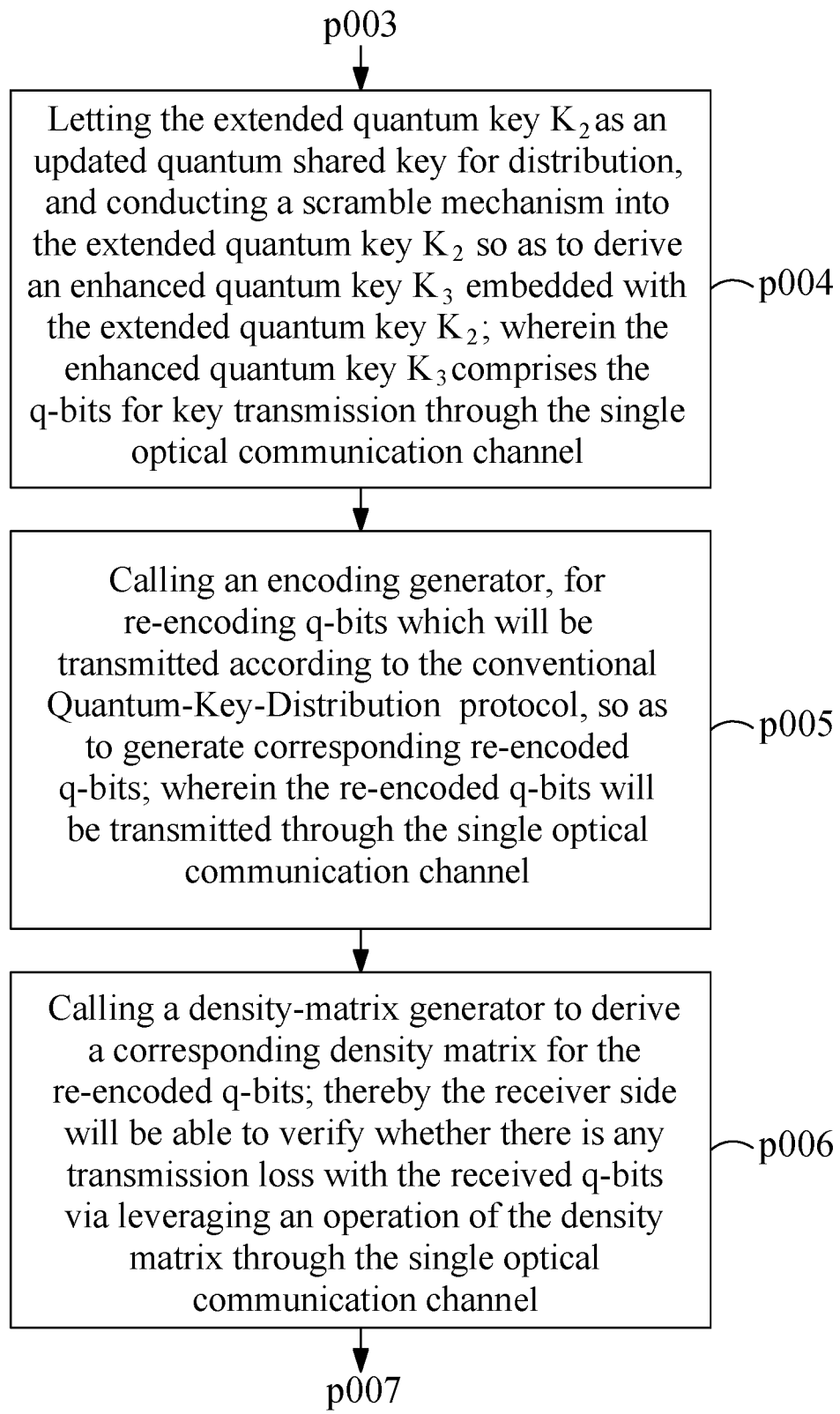
FIG. 2B is a dataflow diagram showing how the system of the present disclosure implements the main security enhanced method to achieve the object of protecting a conventional QKD system.
Figure 2C:
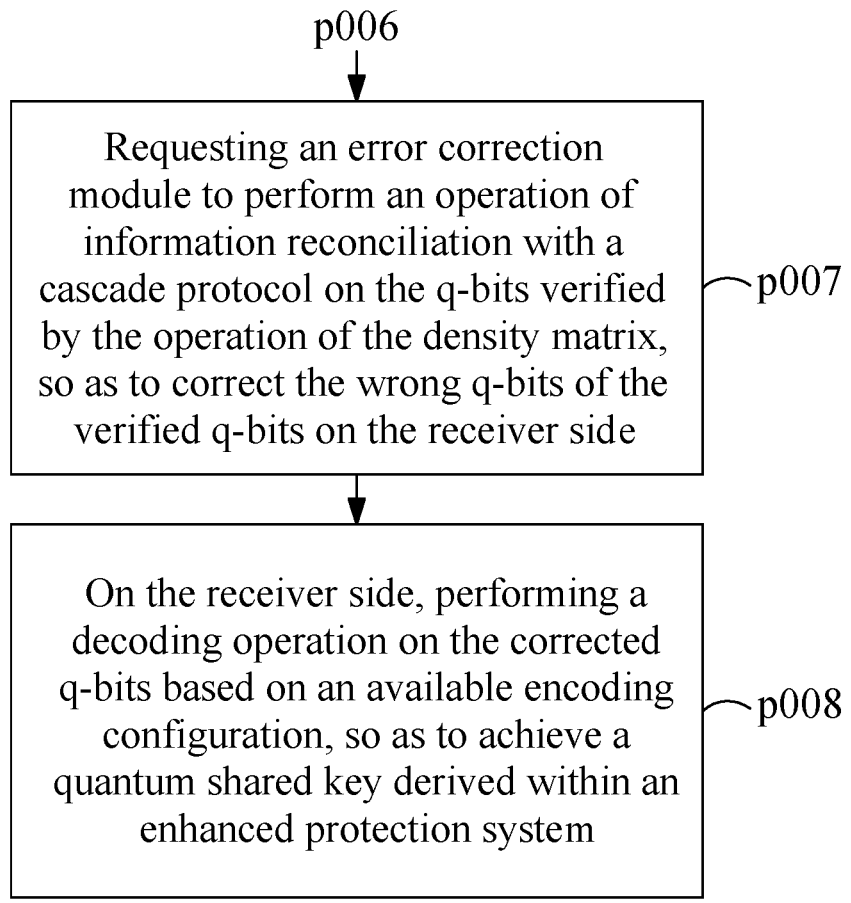
FIG. 2C is a dataflow diagram showing how the system of the present disclosure implements the main security enhanced method to achieve the object of protecting a conventional QKD system.

Still refer to FIG. 1 and also refer to FIG. 2A, FIG. 2B, and FIG. 2C, which are dataflow diagrams showing how the system S1000 of the present disclosure implements the main security enhanced method to achieve the object of protecting a known QKD system. The dataflow of a preferred user case includes the following stages: 1) first, as shown at block p001, the system S1000 makes a transmitter side S1001 and a receiver side S1002 adopt at least three bases with binary bit-states coupled to a conventional Quantum-Key-Distribution protocol (such as BB84) for use, so that the transmitter side S1001 will be able to prepare at least six kinds of polarization states; for example, adopting a polarization angle of $\pi/3$, $\pi/4$, and $\pi/6$ as available bases such that $\pi/3$ stands for binary 0, $5\pi/6$ stands for binary 1, $\pi/6$ stands for binary 0, $2\pi/3$ stands for binary 1, $\pi/4$ stands for binary 0, and $3\pi/4$ stands for binary 1; 2) thereafter, as shown at block p002, the system S1000 sets up a single optical communication channel D101 collaborating with Bragg gratings D102, for transceiving photons with prepared polarization states, and supporting basis measurement for a conventional Quantum-Key-Distribution protocol (BB84 in an embodiment); wherein the Bragg gratings D102 are controlled by the system S1000 to perform an operation of phasing variations; in an embodiment, the operation of phasing variations is performed with $\pi/4$ scales (for example, let phasing $\theta$ as $\pi/4$, $\pi/2$, or $3\pi/4$) so as to provide a signal protection mechanism for optical communications; thereby, via the operation of combining phasing variations provided by the signal protection mechanism, it will be able to gain or shield optical signals without reducing power output of optical sources and can deal with eavesdropping or interference issues as well; 3) thereafter, as shown at block p003, a security length $L_s$ of a quantum key is configured on the transmitter side S1001; once the length $L_{K1}$ of an original quantum key $K_1$ being smaller than $L_s$ wherein $K_1$ is derived according to a conventional Quantum-Key-Distribution protocol (BB84 in an embodiment), deriving an extended quantum key $K_2$ via performing duplicated operations on the original quantum key $K_1$ wherein the length of $K_2$ is $L_{K2}$ which shall be equal to or larger than $L_s$, so as to generate the extended quantum key $K_2$ based on the derived $K_1$ and the configured $L_s$ (when $L_{K1} < L_s \rightarrow L_{K2} = n \cdot L_{K1}$ where $n \in \mathbb{Z}^+$, and $L_{K2} \geq L_s$); otherwise letting the extended quantum key $K_2$ be the same as the original quantum key $K_1$ (if $L_{K1} \geq L_s \rightarrow K_2 = K_1$);

4) thereafter, as shown at block p004, the transmitter side S1001 sets the extended quantum key $K_2$ as an updated quantum shared key for distribution, and conducts a scramble mechanism into the extended quantum shared key $K_2$ so as to derive an enhanced quantum key $K_3$ embedded with the extended quantum shared key $K_2$; wherein the enhanced quantum key $K_3$ comprises the q-bits for key transmission through the single optical communication channel D101; 5) thereafter, as shown at block p005, the transmitter side S1001 calls an encoding generator D103, for re-encoding messages (such as q-bits or communication information) which will be transmitted according to the conventional Quantum-Key-Distribution protocol (BB84 in an embodiment), so as to generate corresponding re-encoded q-bits or communication information; wherein the re-encoded messages will be transmitted through the single optical communication channel D101. In some embodiments, in addition to re-encoding the q-bits of $K_3$, the encoding generator D103 can also be called for re-encoding other quantum information for communication of a known QKD protocol (like BB84) before deriving $K_3$; for example, for some processes, a conventional QKD protocol may require an authenticated public classical channel to perform communications between the transmitter side S1001 and the receiver side S1002 to check where the matched bits are, but the system of the present disclosure can provide various available encodings for the single optical communication channel D101 to replace the use of a public classical channel. In some embodiments, the encoding generator D103 can be implemented with a stand-alone embedded system which can be triggered or driven by the transmitter side S1001;

6) thereafter, as shown at block p006, the transmitter side S1001 calls a density-matrix generator D104 to derive a density operator according to a density matrix generated from the re-encoded q-bits; thereby the receiver side S1002 will be able to determine whether there is any transmission loss according to the received density operator via leveraging an operation of measurement on the received q-bits through the single optical communication channel D101. In some embodiments, the density-matrix generator D104 can be implemented with an embedded FPGA device which can be triggered or driven by the transmitter side S1001; 7) moreover, as shown at block p007, the receiver side S1002 will request an error correction module M101 to perform an operation of information reconciliation with a cascade protocol on the received q-bits, so as to correct the wrong q-bits of the current received q-bits. In some embodiments, the error correction module M101 can be implemented with a virtual machine performed by multiple x86 structured processors, which can be accessed by the receiver side S1002; 8) further, as shown at block p008, the receiver side S1002 performs a decoding operation on the corrected q-bits based on an available encoding configuration, so as to retrieve a quantum shared key derived within an enhanced protection system. For more details, also refer to FIG. 3A and FIG. 3B which are dataflow diagrams showing how the transmitter side S1001 configures a security length $L_s$ with restricted terms to derive an enhanced quantum key $K_3$ related to blocks p003~p004 of FIG. 2A and FIG. 2B.

Figure 3A:
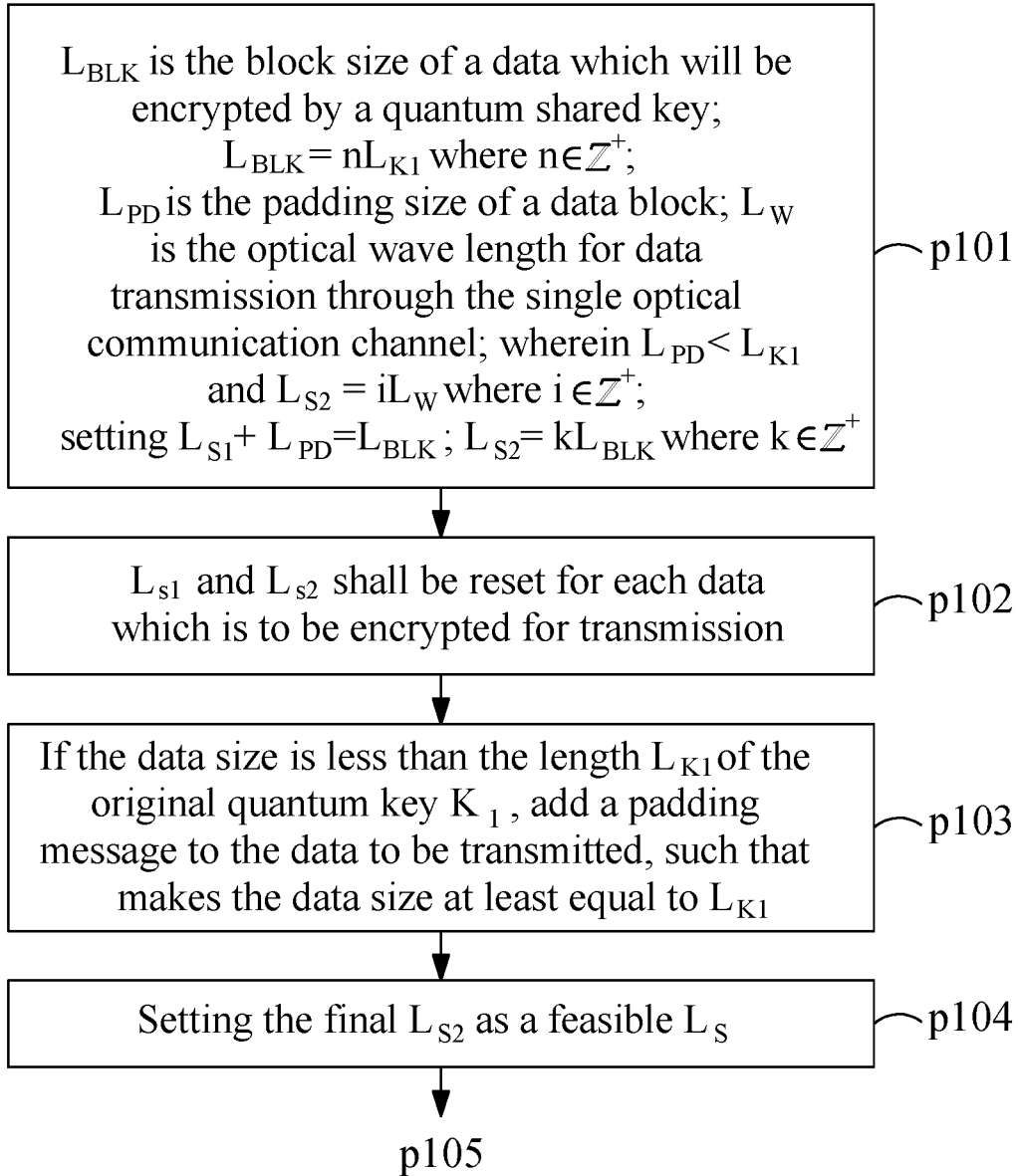
FIG. 3A is a dataflow diagram showing how the system of the present disclosure configures a security length to derive an enhanced quantum key related to FIG. 1.

In an embodiment, there are the following means for configuring the above-mentioned security length $L_s$: as shown at block p101 of FIG. 3A, a) setting a first length $L_{s1}$ based on the block size $L_{BLK}$ of a data which will be encrypted by a quantum shared key; that means the system had better adopt a larger $L_{s1}$ for a big-sized data since the block size $L_{BLK}$ shall be an integral multiple of the length $L_{K1}$ of the original quantum key $K_1$ ($L_{BLK} = n \cdot L_{K1}$ where $n \in \mathbb{Z}^{++}$); b) setting a second length $L_{s2}$ based on the $L_{s1}$ adding a padding size $L_{PD}$; wherein the $L_{s2}$ shall be an integral multiple of the optical wave length $L_W$ for data transmission through the single optical communication channel D101 ($L_{S2} = i \cdot L_W$ where $i \in \mathbb{Z}^{++}$); wherein the padding size $L_{PD}$ is for filling a rest of the block size with changeable stuffs and the padding size $L_{PD}$ shall be smaller than the length $L_{K1}$ of $K_1$ ($L_{PD} < L_{K1}$, $L_{S1} + L_{PD} = L_{BLK}$); as shown at block p102 of FIG. 3A, c) $L_{s1}$ and $L_{s2}$ shall be reset for each data which is to be encrypted for transmission; that means the system will set $L_{s1}$ and $L_{s2}$ again for a new data transmission; as shown at block p103 of FIG. 3A, d) if the data size is less than the length $L_{K1}$ of the original quantum key $K_1$, add a padding message to the data to be transmitted, such that makes the data size at least equal to $L_{K1}$; and as shown at block p104 of FIG. 3A, e) setting the final $L_{s2}$ as a feasible $L_s$.

Figure 3B:
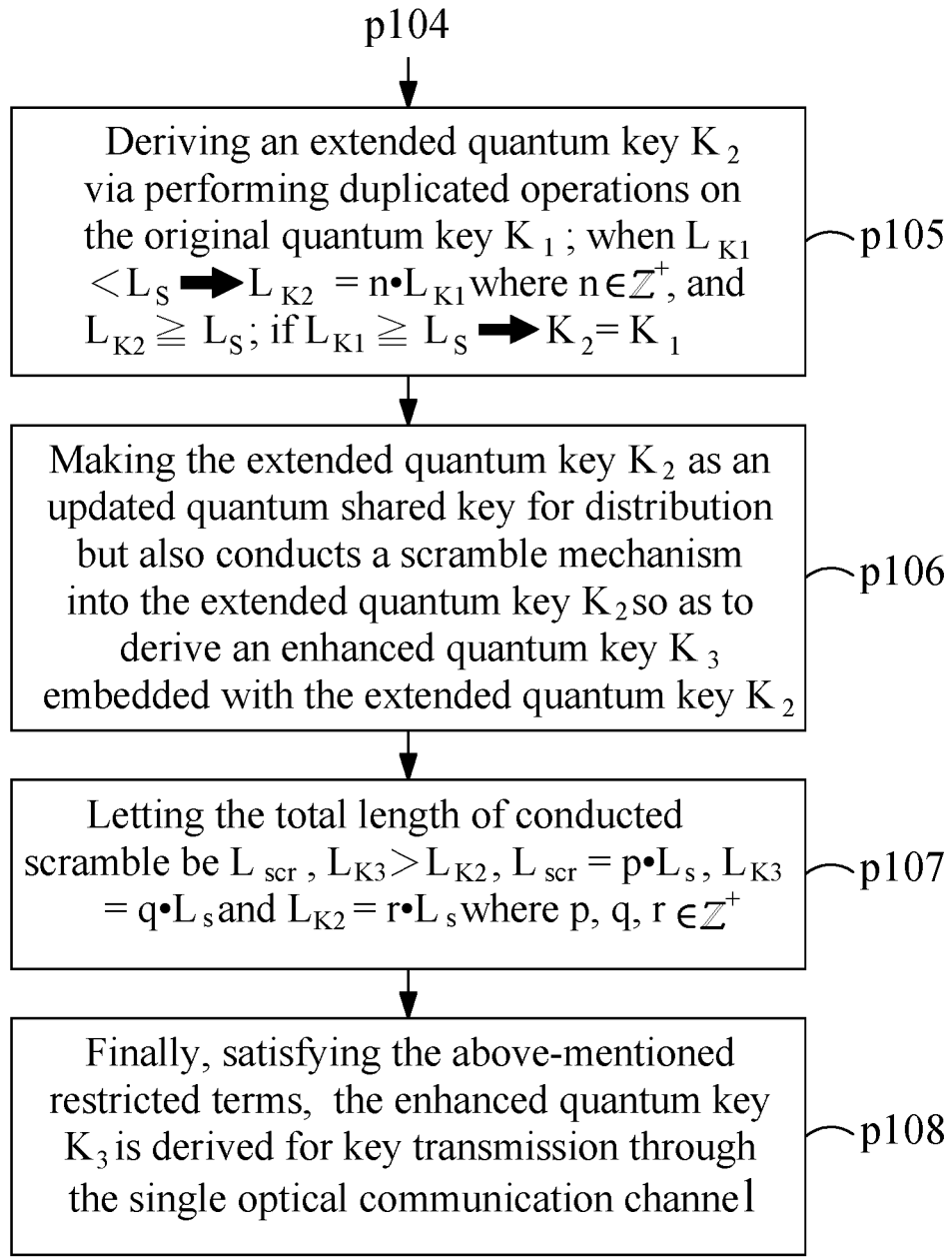
FIG. 3B is a dataflow diagram showing how the system of the present disclosure configures a security length to derive an enhanced quantum key related to FIG. 1.

However, in some embodiments, in order to enhance key strength of a quantum shared key, after deriving $K_1$ and setting up $L_s$, the extended quantum key $K_2$ is derived based on $K_1$ and $L_s$ as shown at block p105 of FIG. 3B. Thereafter, as shown at blocks p106~p107 of FIG. 3B, the transmitter side S1001 not only makes the extended quantum key $K_2$ as an updated quantum shared key for distribution but also conducts a scramble mechanism into the extended quantum key $K_2$ so as to derive an enhanced quantum key $K_3$ embedded with the extended quantum key $K_2$. Further, the transmitter side S1001 requires the following restricted terms for deriving the enhanced quantum key $K_3$ embedded with the extended quantum key $K_2$: a) letting the length of $K_3$ be $L_{K3}$ which shall be larger than $L_{K2}$ for assuring that $K_3$ is embedded with $K_2$ and $L_{K2}$ is not equal to $L_{K3}$ ($L_{K3} > L_{K2}$); and b) letting the total length of conducted scramble be $L_{scr}$, and assuring that all of $L_{scr}$, $L_{K2}$, and $L_{K3}$ shall be an integral multiple of $L_s$. ($L_{scr} = p \cdot L_s$, $L_{K3} = q \cdot L_s$ and $L_{K2} = r \cdot L_s$ where p, q, $r \in \mathbb{Z}^{++}$). Finally, satisfying the above-mentioned restricted terms, the enhanced quantum key $K_3$ is derived with key-strength enhancement for key transmission through the single optical communication channel D101.

Further, still referring to FIG. 1, in an embodiment, in order to enhance security strength in transmission, the transmitter side S1001 usually collaborates with the above-mentioned encoding generator D103 to provide the following available encoding means for setting the system encoding configurations: a) re-encoding the q-bits for transmission with an expression of a Bloch-ball coordinate system; for example, since the state of each q-bit can be expressed as $$|\psi\rangle = \cos\frac{\theta}{2}|0\rangle + e^{i\varphi}\sin\frac{\theta}{2}|1\rangle \quad \theta \in [0, \pi], \varphi \in [0, 2, \pi]$$

based on a Bloch-ball coordinate system, each q-bit can be encoded according to the parameter set [$\gamma$, $\theta$, $\varphi$] wherein $\gamma$ is the distance from the origin to the point ($\theta$, $\varphi$); b) re-encoding the q-bits for transmission with an expression of probability amplitude; c) re-encoding the q-bits for transmission with an expression of density matrix; for example, treating a series of q-bits as a mixed state, so as to derive the density operator $$\rho = \sum_i w_i |\psi_i\rangle \langle \psi_i|,$$

wherein $\psi_i$ is expressed for available bases and $\omega_i$ is expressed for corresponding probability, thus the corresponding density matrix will be Q wherein each element $Q_{ij}$ of the density matrix Q shall be $$\sum_k w_k \langle b_i | \psi_k \rangle \langle \psi_k | b_j \rangle$$

such that a series of q-bits can be encoded according to the parameter pair [$\omega$, $\psi$]; and d) re-encoding the q-bits for transmission via mapping polarization angles onto a time coordinate system formed with clock scales; for example, a q-bit with state of polarization angle $\pi/3$ can be encoded according to the numerical pair [02,00] while a q-bit with state of polarization angle $3\pi/4$ can be encoded according to the numerical pair [04,30].

Moreover, in an embodiment, the above-mentioned operation of the density matrix will be performed by the receiver side S1002 through the single optical communication channel D101 and such operation comprises: a) adopting a measurement operator M to measure the received density matrix; wherein, for $m_{th}$ element of the received density matrix, the measured result is $M_m$, and the corresponding probability of the measured result is $$p(m) = \langle \psi | M_m^+ M_m | \psi \rangle;$$

b) deriving a density operator on the receiver side according to a measured density matrix derived via the measurement operator; in other words, since the receiver side S1002 can collect the measured probabilities through each p(m) derived from the measurement operator M, the collected probabilities can be converted to a density operator $$\rho = \sum_i w_i | \psi_i \rangle \langle \psi_i |$$

wherein $\omega_i$ is the probability of $|\psi_i\rangle$ ; c) deriving $\Sigma_i \omega_i$ which is the sum of the probability of each measured quantum state based on the derived density operator $\rho$; and d) once the sum of the probability of each measured quantum state is equal to or larger than 1, meanwhile each element of the measured density matrix is non-negative, determining that there is no transmission loss with the received q-bits.

Moreover, in the same embodiment, in order to retrieve the quantum shared key such as the above-mentioned $K_1$, $K_3$ or hand-shaking information within q-bits, the above-mentioned decoding operation performed by the receiver side S1002 further comprises the following subroutines: a) measuring and analyzing on the received polarization states for determining whether there is any phase variation with the received polarization states; b) once determining that there is a phase variation with the received polarization states, restoring corresponding phasing status for the received q-bits; and c) performing corresponding communication of a Quantum-Key-Distribution protocol (BB84 in the embodiment) on the received q-bits between the transmitter side and the receiver side to determine bases and matched q-bits for use in a quantum shared key.

While the present disclosure has been described by means of specific embodiments, numerous modifications and variations could be made thereto by those skilled in the art without departing from the scope and spirit of the present disclosure set forth in the claims.

What is claimed is:

1. A system for protecting Quantum-Key-Distribution protocols excluding GHz-clocked Quantum-Key-Distribution systems, the system excluding any authenticated public classical channel and comprising:
    a) a single optical communication channel collaborating with Bragg gratings, for transceiving photons with prepared polarization states, and supporting basis measurement for a Quantum-Key-Distribution protocol; wherein the Bragg gratings are controlled by the system to perform an operation of phasing variations thereby providing a signal protection mechanism for optical communications;
    b) an encoding generator, for re-encoding q-bits which will be transmitted according to the Quantum-Key-Distribution protocol, so as to generate corresponding re-encoded q-bits; wherein the re-encoded q-bits will be transmitted through the single optical communication channel;
    c) a density-matrix generator for deriving a density operator according to a density matrix generated from the re-encoded q-bits; thereby a receiver side will be able to determine whether there is any transmission loss according to the received density operator via leveraging an operation of measurement on the received q-bits through the single optical communication channel; and
    d) an error correction module for performing an operation of information reconciliation with a cascade protocol on the received q-bits, so as to correct the wrong q-bits of the received q-bits;
    thereby the receiver side will perform a decoding operation on the corrected q-bits based on an available encoding configuration which is for collaborating with the encoding generator and the density-matrix generator, so as to retrieve a quantum shared key derived within an enhanced protection system.

2. The system for protecting Quantum-Key-Distribution protocols according to claim 1, in order to verify whether there is any transmission loss with the received density matrix, wherein the operation of the density matrix performed by the receiver side through the single optical communication channel comprises:
    a) adopting a measurement operator to measure the received density matrix;
    b) deriving a density operator on the receiver side according to a measured density matrix derived via the measurement operator;
    c) deriving sum of the probability of each measured quantum state based on the derived density operator; and
    d) once the sum of the probability of each measured quantum state is equal to or larger than 1, meanwhile each element of the measured density matrix is non-negative, determining that there is no transmission loss with the received q-bits through the single optical communication channel.

3. The system for protecting Quantum-Key-Distribution protocols according to claim 1, in order to retrieve a quantum shared key, the decoding operation performed by the receiver side further comprises:
    a) measuring and analyzing on the received polarization states for determining whether there is any phase variation with the received polarization states;

b) once determining that there is a phase variation with the received polarization states, restoring corresponding phasing status for the received q-bits; and c) performing communication of a Quantum-Key-Distribution protocol with the phasing-restored q-bits between a transmitter side and the receiver side to determine bases and matched q-bits for use in a quantum shared key.

4. A method coupled to a single optical communication channel for protecting bases derived from Quantum-Key-Distribution protocols excluding GHz-clocked Quantum-Key-Distribution systems, the method comprising:

a) only adopting a single optical communication channel excluding any authenticated public classical channel to support transmission for a Quantum-Key-Distribution protocol; wherein the single optical communication channel is also coupled to a density-matrix generator and an encoding generator for transmission-loss detection and re-encoded q-bits transmissions;

b) a transmitter side and a receiver side adopting at least three bases with binary bit-states coupled to the Quantum-Key-Distribution protocol for use, so that the transmitter side will be able to prepare at least six kinds of polarization states;

wherein the prepared polarization states will be re-encoded by one of at least four available encoding means to enhance security strength in transmission;

c) setting a security length $L_s$ of a quantum key; once the length of an original quantum key $K_1$ being smaller than $L_s$ wherein $K_1$ is derived according to the Quantum-Key-Distribution protocol, deriving an extended quantum key $K_2$ via performing duplicated operations on the original quantum key $K_1$ wherein the length of $K_2$ is $L_{K2}$ which shall be equal to or larger than $L_s$, so as to generate the extended quantum key $K_2$ based on the derived $K_1$ and the configured $L_s$ (when $L_{K1} < L_s \rightarrow L_{K2} = n \cdot L_{K1}$ where $n \in \mathbb{Z}^+$, and $L_{K2} \geq L_s$); otherwise letting the extended quantum key $K_2$ be the same as the original quantum key $K_1$ (if $L_{K1} \geq L_s \rightarrow K_2 = K_1$); and d) letting the extended quantum key $K_2$ as an updated quantum shared key for distribution, and conducting a scramble mechanism into the extended quantum key $K_2$ so as to derive an enhanced quantum key $K_3$ embedded with the extended quantum key $K_2$; wherein the enhanced quantum key $K_3$ is for key transmission through the single optical communication channel.

5. The method for protecting the Quantum-Key-Distribution protocols according to claim 4, in order to configure a security length $L_s$, the method further comprising the following means:

a) setting a first length $L_{s1}$ based on the block size of a data which will be encrypted by a quantum shared key;

b) setting a second length $L_{s2}$ based on the $L_{s1}$ adding a padding size; wherein the $L_{s2}$ shall be an integral multiple of the optical wave length for data transmission through the single optical communication channel;

c) $L_{s1}$ and $L_{s2}$ shall be reset for each data which is to be encrypted for transmission;

d) if the data size is less than the length $L_{K1}$ of the original quantum key $K_1$, add a padding message to the data to be transmitted, which makes the data size at least equal to $L_{K1}$; and e) setting the final $L_{s2}$ as a feasible $L_s$.

6. The method for protecting the Quantum-Key-Distribution protocols according to claim 4, in order to enhance key strength of a quantum shared key, after deriving $K_1$ and setting up $L_s$, the method requiring the following restricted terms for deriving the enhanced quantum key $K_3$ embedded with the extended quantum key $K_2$:

a) letting the length of $K_3$ be $L_{K3}$ which shall be larger than $L_{K2}$ for assuring that $K_3$ is embedded with $K_2$ and $L_{K2}$ is not equal to $L_{K3}$; and b) letting the total length of conducted scramble be $L_{scr}$, and assuring that all of $L_{scr}$, $L_{K2}$, and $L_{K3}$ shall be an integral multiple of $L_s$.

7. The method for protecting the Quantum-Key-Distribution protocols according to claim 4, in order to enhance security strength in transmission, the method providing the following available encoding means through the single optical communication channel:

a) re-encoding the q-bits for transmission with an expression of a Bloch-ball coordinate system;

b) re-encoding the q-bits for transmission with an expression of probability amplitude;

c) re-encoding the q-bits for transmission with an expression of density matrix; and d) re-encoding the q-bits for transmission via mapping polarization angles onto a time coordinate system formed with clock scales.

* * * * *